Sept. 7, 1954 C. OTTO 2,688,533
SPRAY REACTOR CRYSTALLIZER FOR AMMONIA
Filed June 23, 1950
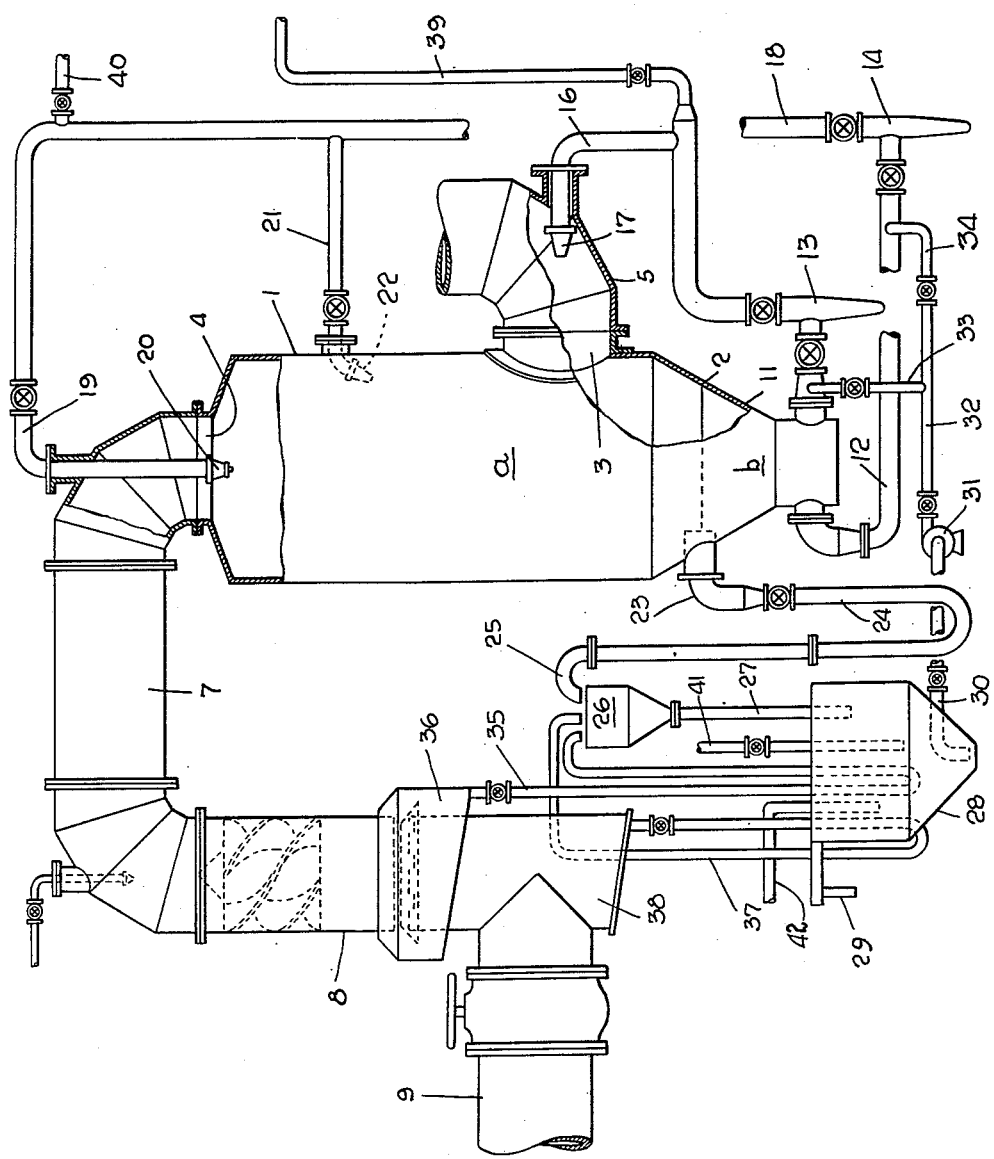
INVENTOR
CARL OTTO
BY John E. Hubbell
ATTORNEY

Patented Sept. 7, 1954

2,688,533

UNITED STATES PATENT OFFICE 2,688,533

SPRAY REACTOR CRYSTALLIZER FOR AMMONIA

Carl Otto, Manhasset, N. Y.

Application June 23, 1950, Serial No. 169,882

6 Claims. (Cl. 23—273)

The general object of the present invention is to provide improved apparatus for utilizing the ammonia content of a gas, such as coke oven gas, having a small ammonia content, in the production of ammonium sulphate by the liquor and crystal dispersion, or spray, method which is now in commercial use in this country. That method was invented by me and is disclosed and claimed in my Patent 2,599,067, granted June 3, 1952.

In the liquor and crystal dispersion method of producing sulphate of ammonia from a gas such as coke oven gas, the latter is passed continuously through a substantially unobstructed scrubbing space and finely divided saturated ammonium sulphate liquor having a free sulphuric acid content and entraining a substantial amount of ammonium sulphate crystals is continuously sprayed into said space. The said method is characterized in particular by the numerous steps simultaneously effected in the scrubbing space. Those steps include the production of ammonium sulphate by the reaction of the ammonia content of the gas with sulphuric acid; the supersaturation of the ammonium sulphate liquor sprayed into and formed in said space; the formation of ammonium sulphate crystal nuclei; and some desupersaturation of the subdivided liquor by the conversion of a portion of the liquor into crystalline ammonium sulphate deposited on the entrained and newly formed crystals with a resultant crystal growth. The liquor and crystals dropping out of the scrubbing space pass into a liquor and crystal filled crystallizing space in which the desupersaturation of the liquor is completed and further crystal growth is effected. Liquor and crystals are continuously withdrawn from the crystallizing space. The major portion of the liquor and crystals withdrawn from the crystallizing space is passed back into the scrubbing space through the spray nozzles, and the remainder of the liquor and crystals so withdrawn is passed to crystal separating and treating apparatus which may be of customary type. The apparatus disclosed in my above mentioned copending application includes a form in which the crystallizing space is in the same tank with, and directly beneath the scrubbing space, and another form in which the crystallizing space is in a tank or receptacle separate from the tank enclosing the scrubbing space and into which the latter drains.

The particular forms of apparatus disclosed in detail in my above mentioned patent were primarily designed and adapted for use with a scrubbing space gas pressure which does not differ greatly from atmospheric pressure. The primary object of the present invention is to provide simple and effective apparatus of the general type and form disclosed in my main application, in which the ammonia carrying gas in the scrubbing space may be maintained under a pressure which is substantially above atmospheric pressure, without requiring any material changes in the general structure of the apparatus.

A more specific but practically important object of the present invention is to provide novel circulating provisions for withdrawing liquor and crystals from a crystallizing space in the lower end portion of the tank enclosing the scrubbing space, and returning the liquor to the scrubbing space through spray nozzles, without reducing the pressure of the liquor significantly below the pressure in the scrubbing space at any point in the closed or continuous flow path through which the liquor passes successively through the scrubbing and crystallizing spaces and is passed from the latter back into the scrubbing space through the spray nozzles.

Another specific object of the invention is to provide simple and effective means for removing from the crystallizing space the tar continuously separating from the ammonia carrying gas in the scrubbing space along with a small portion of liquor through overflow piping including liquor and tar seal which can be readily modified or adjusted when it becomes desirable to make a substantial change in the pressure maintained in the scrubbing space.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

The one drawing figure is a diagram illustrating a desirable form of the present invention.

The embodiment of the invention, illustrated by way of example, comprises a vertically disposed tank 1 enclosing an upper scrubbing space $a$ and a lower crystallizing space $b$. The tank 1 has a hopper bottom portion 2 and a lateral gas inlet opening 3 in the lower end portion of the cylindrical tank body, and a gas outlet 4 in the top wall or head of the tank. In normal operation, coke oven gas passes into the tank from a gas main section 6 through a bent pipe connection 5 and the inlet opening 3. Gas passes out of the tank through its outlet opening 4 into the downturned inlet end of a bent pipe section 7. The latter has its downturned outlet connected to the upper end of an acid catcher 8 of known type. The latter discharges into a horizontal gas main section 9. Liquor and entrained crystals are withdrawn from a collecting chamber 10 at the lower end of the hopper bottom portion 2 of the tank, through valved pipes 11 and 12 connected to the inlets of pumps 13 and 14, respectively.

The valved outlet pipe 16 of the pump 13 is connected to a spray nozzle 17 mounted in the pipe section 5, and commonly referred to as the inlet nozzle and having its axis horizontal and substantially coincident with the axis of the inlet opening 3. The inlet nozzle 17 discharges crystals and finely subdivided liquor into the generally horizontal stream of gas passing through the pipe section 5 to and through the inlet opening 3 into the scrubbing space $a$. The pump 14 has an upwardly extending valved outlet pipe 18 with branches 19 and 21. The branch 19 has a depending discharge end portion mounted in the pipe section 7 and carrying at its lower end a nozzle 20. The latter is shown as coaxial with the tank 1 and having its lower discharge end slightly below the level of the lowermost portion of the inlet opening 4. The nozzle 20 is arranged to discharge crystals and finely subdivided liquor in a downwardly directed spray coaxial with the axis of the space $a$. The branch pipe 21 extends horizontally through the vertical tank wall into the space $a$, and has a down turned end portion in that space connected to a spray nozzle 22. The nozzle 22 is arranged to discharge crystals and finely divided liquor in a spray directed downwardly and away from the adjacent tank wall.

The hopper bottom portion 2 of the tank 1 encloses a bath space $b$ containing a pool or body of liquor and crystals, the normal top level of which is controlled by an overflow pipe having a horizontal inlet end portion 23 opening through the tank wall into the upper portion of the bath space. The overflow pipe includes a depending, seal forming, loop 24. One leg of the loop 24 has its upper end connected to the inlet pipe portion 23. The other leg of the loop 24 is longer than the first mentioned leg, and is shown as having its upper end portion in the form of a goose neck discharge section 25. The goose neck section discharges into a funnel like receptacle 26 open at its upper end to the atmosphere, and having a depending drain pipe 27. The open lower end of the latter extends down into the liquor and crystal holding space of an overflow tank or tar pot 28. The latter is formed with an upper tar skimmer outlet 29.

The tar separating from the gas in the tank 1 and collecting at the top of the liquor in the bath space $b$, passes therefrom through the overflow pipe to the tar pot 28 along with a small amount of liquor and crystals. A small portion of the liquor and crystals entering the tank 28 passes away from the tank with the tar through the tar skimmer outlet 29. The remainder of the liquor, along with the crystals collecting in the hopper bottom portion of the tank 28, is withdrawn from the latter through the valved inlet pipe 30 of a pump 31. The valved outlet pipe 32 of the pump 31 comprises valved branches 33 and 34. The branch 33 is connected to the inlet pipe 11 of the pump 12, and the branch 34 is connected to the inlet pipe 12 of the pump 14.

In normal operation, a major portion of the liquor entrained by the gas passing through the pipe section 7 is separated from the gas in the acid catcher 8, and is collected in a receiver 36. The latter has a valved drain pipe 35 with a goose neck discharge portion which extends above, and discharges into the receptacle 26. The pipe 35 includes a seal forming loop portion, the lower end of which is at a substantial distance below the top of the receptacle 26. Substantially all of the entrained liquor particles passing from the acid catcher downward through the vertical gas pipe section connecting the acid catcher 8 to the pipe section 9, accumulate in the collecting space 38. The latter is provided with a valved drain pipe 37. The drain pipe 37 is like the drain pipe 35 in that it includes a depending, seal forming, loop portion, and an upper goose neck discharge end portion above and discharging into the receiver 26. The depending, seal forming, loop portion 24 of the overflow pipe, and the depending, seal forming, loop portions of the drain pipes 35 and 37 should be long enough to prevent the gas pressure transmitted to the inlet ends of each of said pipes from forcing all of the liquor out of the seal forming loop portion of the pipe, and thus allow gas to blow out through the pipe. This means, of course, that the minimum length of each seal forming loop is determined by the excess of the gas pressure at the inlet end of the pipe above the pressure of the atmosphere, and by the specific gravity of the liquor mixture passing through the seal forming loop. That specific gravity will vary with operating conditions, but ordinarily will be about 1.35.

Where space requirements permit, the seal forming loop portions of the drain pipes 35 and 37 may be made of sufficient vertical extent to permit of proper operation with quite wide variations in the difference between the scrubbing chamber pressure and the external atmospheric pressure. In the case of the overflow pipe from the bath space $b$, however, any appreciable variation in the difference between said gas pressures will require some readjustment of the overflow piping, producing the effect obtained by varying the elevation of the goose neck portion of the over flow pipe above the horizontal inlet portion 23 of the pipe. Theoretically, the necessity for actually changing the vertical distance between the pipe sections 23 and 25 may be avoided by providing means for automatically throttling the flow through the overflow pipe in accordance with variations in the difference between the gas pressure in the chamber $a$ and the pressure of the atmosphere. In practice, however, I now believe that the desired adjustments will ordinarily be effected by replacement of overflow piping sections by other sections of different lengths, or by providing telescopic joints in the piping.

A portion of the liquor and crystals withdrawn from the chamber 10 by the pump 13 is normally passed through a valved branch 39 of the pipe 16 to a salt tank or other crystal separating and treating apparatus. The latter may take various forms, one of which is shown in my copending application, Serial No. 134,392, filed November 1, 1949, now abandoned. The outlet pipe 18 of the pump 14 also has a valved branch 40 through which liquor and crystals may be passed to said salt tank or other apparatus. The make-up sulphuric acid necessary to compensate for the acid passing out of the spray liquor into combination with the ammonia separated from the gas, is supplied through a valved pipe 41 having its lower discharge end submerged in the overflow tank 28. I ordinarily consider it desirable to have the acid content of the liquor sprayed into the upper portion of the scrubbing space higher than in the liquor sprayed into the lower portion of the scrubbing space through the inlet nozzle 17. To obtain this result, the valve in the branch outlet pipe 33 of the pump 31 may be closed so that all of the liquor and crystal mixture and make-up acid withdrawn from the tank 28 will be passed by the pump 14 to the upper and intermediate nozzles 20 and 22. To minimize the acid content of the liquor passing to the salt tank, the valve in the outlet branch 40 of the pipe 18, may be normally closed. The branch pipes 33 and 40 must each be open, however, under the conditions in which the pump 14 is temporarily shut down while the pump 13 remains in operation.

The apparatus shown by way of illustration in the drawing will ordinarily include provisions for heating the wall of the tank 1 to reduce the tendency to the formation of ammonium sulphate crystal deposits, or "rock" salt, on the inner wall of the tank, and for injecting hot water into the tank and piping at appropriate points when and as needed to prevent or eliminate objectionable salt deposits, and to make up for the evaporation of water from the liquor in the scrubbing space. Such features of construction need not be illustrated or further referred to herein, however, as they are employed in liquor and crystal dispersion apparatus for the production of ammonium sulphate now in commercial use in this country.

Except in respect to its above mentioned features provided because of the substantial excess over atmospheric pressure of the pressure of the scrubbing space, the general structure and operation of the apparatus shown may be generally similar to that of apparatus described in my Patent 2,599,067 and now in commercial use. Each of the spray nozzles 17, 20 and 22 may well be of the widely used type disclosed in the Eneas Patent No. 1,101,264, of June 23, 1914. While I prefer to employ only a single lower nozzle located in the inlet pipe section as is the nozzle 17, the number of nozzles at higher levels may vary with conditions. For example, in lieu of a single upper nozzle and a single intermediate nozzle, there may be a plurality of upper nozzles, and a plurality of intermediate nozzles. When use is made of a plurality of upper or intermediate nozzles, the different nozzles will ordinarily be carried at the discharge ends of pipe sections extending through the cylindrical wall of the tank and spaced about the axis of the tank.

The total amount of the liquor sprayed into the scrubbing space will depend upon the amount of coke oven gas passing through the space $a$, and upon the desired average size of crystals produced. As is explained in my copending application, Serial No. 168,801, filed on June 17, 1950 (now abandoned), the size of the crystals produced may be increased or decreased by respectively increasing or decreasing the quantity of the liquor and crystals sprayed into the scrubbing space $a$ through the inlet nozzle 17. In producing crystals having an average size similar to or larger than that of the grade of ammonium sulphate salt known as "Grade I" salt, the liquor and crystals sprayed into the space $a$ through the inlet spray nozzle 17 may vary between twenty thousand and sixty thousand gallons per ton of salt produced. Grade I ammonium sulphate salt consists of crystals, none of which are over 4 mm. in length, and 40% of which will not pass through a 35 mesh screen, and not more than 5% of which will pass through a 70 mesh screen.

As explained in my last mentioned copending application, I have found that in a scrubbing chamber with a gas inlet and inlet spray nozzle arranged as in Fig. 1, not less than about 90% of the ammonia in the gas will be separated from the gas by the liquor sprayed through the inlet nozzle, even when the amount of liquor sprayed through that nozzle is not more than about three thousand gallons per ton of salt produced. However, even when the amount of liquor sprayed through that nozzle is as great as, or greater than sixty thousand gallons per ton of salt produced, it will ordinarily be desirable, I believe, to spray not less than about 18,000 gallons of liquor and crystals into the space $a$ through the top and intermediate nozzles, to insure the separation from the gas of all but a small fraction of 1% of its original ammonia content.

Practically important advantages obtainable in operating with gas pressure in the space $a$ which is substantially, for example, from 10 to 15 pounds, in excess of atmospheric pressure. For one thing, such an increase in the gas pressure in the scrubbing space will substantially increase the rate at which the ammonia carrying gas can be passed through a scrubbing chamber of a given diameter. Other things being equal, when the ratio of the actual gas pressure in the scrubbing space $a$ to the pressure of the atmosphere is increased above unity, the amount of gas passed through the scrubbing space may be increased in the same ratio.

A practically important advantage of the invention is that with the arrangement shown, the pumps 13 and 14 do not operate against a back pressure component due to the difference between the gas pressure in the space $a$ and the pressure of the atmosphere. In the apparatus shown in Fig. 1, substantially all of the pumping energy required to effect the desired circulation of liquor and crystals is that required to operate the pumps 13 and 14 which pass liquor to the spray nozzles. With the tank 28 open to the atmosphere as shown, the pump 31 does operate against a back pressure including a component due to the excess of the pressure in the space $a$ over the pressure of the atmosphere. This is of small practical importance, however, because of the small amount of liquor which must be moved by the pump 31 in normal operation. It is theoretically possible to reduce the load on the pump 31 by raising the level of the tank 28 relative to the bath space $b$, but the saving in pumping energy thereby obtained is not sufficient to make the change practically important.

In apparatus operating under pressure substantially higher than atmospheric pressure, I now consider it preferable to employ an arrangement in which the crystallizing space is formed in the lower end of the tank enclosing the scrubbing space as shown herein. In such case, I consider it ordinarily desirable to proportion the apparatus so that not less than 136 gallons, and not more than 200 gallons of liquor and crystals per thousand gallons of liquor circulated, may be held in the crystallizing space at any one time. Experiments which I have made indicate that if 136 gallons of liquor and crystals are held in the crystallizing space at one time for each thousand gallons of liquor circulated, the movement of the liquor through the space $b$ will be slow enough to insure proper desupersaturation. The crystallizing space $b$ should not be larger than is needed because it is desirable to keep the bulk of the apparatus small, and also because it is desirable to minimize the amount of water which must be used to keep the saturator apparatus clean and free from rock salt deposits. If the bath space does not exceed 200 gallons per thousand gallons of liquor and crystals circulated, the period during which the production of salt is interrupted when the bath is "killed" by the hot cleaning water, will be relatively and desirably short. Moreover, the avoidance of unnecessary crystallizing space facilitates the cleaning of the inside of the saturator and hastens the dissolution of the rock salt deposits.

The pumping means for moving liquor from the crystallizing space to the spray nozzles is characterized by its comparative simplicity and inherently low apparatus costs. With the pumps 13 and 14 of the same type and size and suitably large, each is well adapted to handle the entire output of spray liquor in emergencies, though this involves the non-use of the inlet spray nozzle 17 when the pump 13 is temporarily out of service, and the non-use of the nozzles 20 and 22 when the pump 14 is temporarily out of service. Such temporary non-use of all the nozzles may result in the waste of a small portion of the ammonia content of the gas from time to time during brief operating periods. However the value of the small amount of ammonia so wasted is small in comparison with the installation and maintenance costs of a third pump to serve as a standby for each of the pumps 13 and 14.

A practically important characteristic of the liquor and crystal dispersion method, is the maintenance of a relatively large amount of ammonium sulphate crystals in contact with the acidified ammonium sulphate liquor in all portions of the continuous or closed circulation flow path including the scrubbing space, the crystallizing bath and associated conduits and pumping means through which liquor and crystals are passed from the crystallizing space $b$ back into the scrubbing space $a$. Liquor separated from the crystals in the centrifuge or other crystal drying apparatus may be returned through the pipe 42 to the tank 28 for return to the tank 1 by the pump 31. Ordinarily, I believe that the apparent crystal content of the acidified ammonium sulphate spray liquor and crystal mixture should be not less than about 20% and not higher than about 50%. The "apparent" crystal content of the mixture may be determined by filling a cylindrical graduate with the liquor and crystal mixture freshly withdrawn from the circulation path, and measuring the percentage of the total length of the graduate of the portion containing crystals after the latter have been permitted to settle into a continuous crystal column in the lower portion of the graduate. When the settled crystals fill half the length of the graduate, the "apparent" crystal content of the liquor is 50%.

This application is a continuation in part of my prior application, Serial No. 141,963, filed February 2, 1950, now Patent No. 2,646,345, which discloses and specifically claims a different specific form of the invention generically claimed herein.

While in accordance with the provision of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In apparatus for treating gas having a small ammonia content to produce sulphate of ammonia by the liquor and crystal dispersion method including a vertically disposed tank having a liquor desupersaturating and crystallizing bath space in its lower end portion and an unobstructed scrubbing space above said bath space, nozzle means for spraying liquor and crystals into said scrubbing space and a tar eliminating and desupersaturating tank external to the first mentioned tank and having its upper end open to the atmosphere, the improvement comprising in combination means for passing the gas treated into and through said scrubbing space under a pressure substantially higher than atmospheric pressure, means for withdrawing liquid from the upper portion of said bath space as required to prevent the upper end of said bath space from rising above a predetermined level, the last mentioned means including an overflow conduit having its inlet end opening into the bath space and its outlet end open to the atmosphere at a level high enough to normally maintain a fluid pressure head in said pipe at least as great as the difference between the gas pressure in the scrubbing space and the pressure of the atmosphere, and overflowing and pumping means for withdrawing crystals and acidulated ammonium sulphate liquor from the lower portions of each of said tanks and passing the liquor and crystals so withdrawn into said scrubbing space through said spray nozzle means.

2. An improvement as specified in claim 1, including means for passing make-up sulphuric acid into said tar eliminating and desupersaturating tank.

3. An improvement as specified in claim 1, including a separate pump for withdrawing liquor and crystals from each of said tanks.

4. An improvement as specified in claim 1, including two pumps for withdrawing liquor and crystals from the lower portion of said bath space and means for spraying the liquor and crystals so withdrawn from said bath space by each pump into a portion of said scrubbing space at a different level from that into which the liquor and crystals withdrawn by the other pump is sprayed.

5. An improvement as specified in claim 4, including a third pump for withdrawing liquor and crystals from said tar eliminating and desupersaturating tank and means for passing the liquor and crystals withdrawn by said third pump optionally into one or the other of the two pumps withdrawing liquor and crystals from said bath space.

6. In apparatus for producing sulphate of ammonia from gas having a small ammonia content, the combination comprising a vertically disposed tank having a liquor desupersaturating and crystallizing bath space in its lower end portion and an unobstructed scrubbing space above said bath space and having a gas inlet and a gas outlet respectively adjacent the lower and upper ends of said scrubbing space, means for passing said gas into said scrubbing space through said inlet under a pressure appreciably higher than atmospheric pressure, means for withdrawing gas from said scrubbing space through said outlet without significant change in its pressure, means for maintaining the upper level of said bath space below said inlet opening comprising an overflow pipe having a depending loop comprising two pipe portions connected at their lower ends and having the upper end of one of said portions opening into said bath space and having the upper end of its other portion discharging into the atmosphere at the elevation above the first mentioned level required to establish a fluid pressure head in said pipe substantially equal to the normal difference between the gas pressure in said scrubbing space and the pressure of the atmosphere, and means including a tar eliminating tank open at its upper end receiving the liquor discharged by said overflow pipe, and pumping means for withdrawing ammonium sulphate liquor and ammonium sulphate crystals from each of said tanks and spraying the liquor and crystals so withdrawn into said scrubbing space.

References Cited in the file of this patent

UNITED STATES PATENTS

| Number | Name | Date |
|---|---|---|
| 291,264 | Addie | Jan. 1, 1884 |
| 824,092 | Brunck | June 26, 1906 |
| 1,013,404 | Koppers | Jan. 2, 1912 |
| 1,163,752 | Hilleke | Dec. 14, 1915 |
| 2,000,038 | Schmalenbach | May 7, 1935 |
| 2,482,643 | Tiddy | Sept. 20, 1949 |

FOREIGN PATENTS

| Number | Country | Date |
|---|---|---|
| 258,975 | Germany | Apr. 22, 1913 |